United States Patent
Fugleberg

(10) Patent No.: US 7,118,719 B2
(45) Date of Patent: Oct. 10, 2006

(54) METHOD FOR THE HYDROLYTIC PRECIPITATION OF IRON

(75) Inventor: Sigmund Fugleberg, Turku (FI)

(73) Assignee: Outokumpu Technology Oy, Espoo (FI)

(*) Notice: Subject to any disclaimer, the term of this patent is extended or adjusted under 35 U.S.C. 154(b) by 384 days.

(21) Appl. No.: 10/450,921

(22) PCT Filed: Dec. 7, 2001

(86) PCT No.: PCT/FI01/01065

§ 371 (c)(1),
(2), (4) Date: Nov. 19, 2003

(87) PCT Pub. No.: WO02/46481

PCT Pub. Date: Jun. 13, 2002

(65) Prior Publication Data

US 2004/0067183 A1    Apr. 8, 2004

(30) Foreign Application Priority Data

Dec. 8, 2000    (FI)    .................... 20002699

(51) Int. Cl.
- *C01G 1/00* (2006.01)
- *C01G 9/00* (2006.01)
- *C01G 49/00* (2006.01)

(52) U.S. Cl. .................. 423/138; 423/140; 423/146; 423/147; 423/150.1; 423/150.3; 423/99; 423/109

(58) Field of Classification Search ............. 423/138, 423/140, 146, 147, 150.1, 99, 109, 150.3
See application file for complete search history.

(56) References Cited

U.S. PATENT DOCUMENTS

| | | | |
|---|---|---|---|
| 3,434,947 A | 3/1969 | Steintveit | |
| 3,652,264 A | 3/1972 | Bodson | |
| 3,985,857 A | 10/1976 | Menendez et al. | |
| 4,042,474 A | 8/1977 | Saarinen | |
| 4,128,617 A * | 12/1978 | DeGuire et al. | 423/106 |
| 4,193,970 A * | 3/1980 | Sefton et al. | 423/141 |
| 4,305,914 A * | 12/1981 | Pammenter et al. | 423/146 |
| 5,453,253 A * | 9/1995 | Von Ropenack et al. | 423/138 |
| 6,340,450 B1 * | 1/2002 | Fugleberg et al. | 423/109 |

FOREIGN PATENT DOCUMENTS

| | | |
|---|---|---|
| CA | 2104736 | 2/1995 |
| WO | WO 97/07248 | 2/1997 |
| WO | WO 98/06879 | 2/1998 |

* cited by examiner

*Primary Examiner*—Timothy Vanoy
(74) *Attorney, Agent, or Firm*—Morgan & Finnegan, LLP; Michael Willis

(57) ABSTRACT

The invention relates to a method for the hydrolytic precipitation of iron as jarosite from a sulphate-containing solution in connection with zinc recovery from zinc calcine. The recovey contains neutral leach, ferrite leach, zinc electrolysis and iron precipitation stages. The ferrite included in the calcine is leached with return acid of the electrolysis after which the iron present in ferrous form is neutralized and routed to an iron precipitation stage, where the iron is oxidised to the trivalent form using an oxygen-containing gas. Also present in the precipitation stage arc Na, K or $NH_4$ ions and jarosite nuclei.

10 Claims, 1 Drawing Sheet

METHOD FOR THE HYDROLYTIC PRECIPITATION OF IRON

The present invention relates to a method for the hydrolytic precipitation of iron from a sulphate solution as jarosite. A sulphate-containing solution, with iron present in the solution in divalent form, is routed to an iron precipitation stage, where the iron is oxidised to the trivalent form using oxygen-containing gas. Also present in the precipitation stage are Na, K or $NH_4$ ions and jarosite nuclei.

Zinc calcine, obtained by roasting sulphidic zinc concentrates, is generally used as the starting material in the electrolytic preparation of zinc. The chief component of the calcine is zinc oxide, ZnO, but some of the zinc is also bound to iron in the form of zinc ferrite $ZnOFe_2O_3$. The amount of zinc ferrite is usually so considerable that zinc recovery from that is unavoidable. Zinc oxide is easily soluble even at high pH values (3–5) whereas ferrite has to be leached at higher acid content. Ferrite leaching is performed in a separate stage, where both zinc and iron are dissolved according to the following reaction:

$$ZnOFe_2O_3 + 4H_2SO_4 ==> ZnSO_4 + Fe_2(SO_4)_3 + 4H_2O \quad (1)$$

The iron has to be precipitated from the solution obtained before the solution can be returned to the neutral leach and from there to zinc sulphate solution purification and electrolysis. There are no clear guidelines as to how much iron may be in the solution to be returned to the neutral leach, but generally the level of 5 g/l Fe is considered acceptable. The above process is described in e.g. U.S. Pat. Nos. 3,434,947 and 3,493,365.

In industrial processes zinc oxide leaching, neutral leach, is generally carried out in two stages at a pH of 2–5 and ferrite leaching can also be performed in two stages when the acid content is between 30–100 g/l. A precipitate is obtained from ferrite leaching, which contains the lead, silver and gold from the calcine. The recovery of these materials may be profitable in favourable conditions. The solution from ferrite leaching, which contains the dissolved zinc and iron, is very acidic, and if often pre-neutralised, before the iron is precipitated from it. Three iron precipitation processes are in use and in them the iron is precipitated as either jarosite $Na[Fe_3(SO_4)_2(OH)_6]$, goethite FeOOH or hematite $Fe_2O_3$.

When iron is precipitated as jarosite or goethite, a neutralising agent is to be used in precipitation to neutralise the sulphuric acid released in the reactions. Normally the neutralising agent is a calcine. When neutralisation is carried out with a calcine, the indium, gallium and most of the germanium contained in the solution remain in the jarosite precipitate in the same way as the zinc, copper and cadmium as well as the indium, gallium, silver, gold and lead contained in the ferrite of the calcine. In most cases these valuable metals are lost in the iron precipitate. In order to minimise the amount of calcine needed for neutralisation and therefore minimise losses as much as possible it is worth using pre-neutralisation.

When iron is precipitated as hematite, it occurs hydrolytically by oxidising from the solution without neutralisation, from which solution the iron is first reduced from trivalent to divalent form:

$$2FeSO_4 + O_2(g) + 2H_2O ==> Fe_2O_3 + 2H_2SO_4 \quad (2)$$

The loss of valuable metals mentioned above is avoided in hematite precipitation. The precipitation of iron must however be performed in an autoclave at temperatures of about 200° C., which has essentially restricted the adoption of the method, even though hematite is in fact the most environmentally friendly form of iron precipitate.

The hydrolytic precipitation of iron without neutralisation in atmospheric conditions would give great benefits, and a certain method for the precipitation of iron as jarosite is described in U.S. Pat. No. 4,305,914. The method is based on the fact that jarosite is stable in very acidic solutions and that the partial precipitation of iron is possible using the following balance reaction, when starting from a neutral ferri solution:

$$3Fe_2(SO_4)_3 + Na_2SO_4 + 12H_2O <=> 2Na[Fe_3(SO_4)_2(OH)_6] + 6H_2SO_4 \quad (3)$$

After ferrite leaching, the solution is cooled and the residual acid is neutralised for instance with a calcine. After neutralisation, the solution is heated and the iron may be precipitated from the solution in the presence of sodium, potassium or ammonium ions and recycled jarosite without the addition of a neutralising agent. The industrial realisation of this method has not however been successful, since the method is not economically profitable. In the first place, the solution containing trivalent iron from the ferrite leaching must be cooled before pre-neutralisation, so that the precipitation of iron does not take place at this stage. The second important factor is that iron cannot be precipitated out in the precipitation stage at sufficiently low contents, because the precipitation rate slows down due to the large amount of sulphuric acid generated in the reaction. In order for the precipitation to be successful, the solution has to be diluted to about half before precipitation. Precipitation of iron succeeds best from a hot solution, which means the solution has to be reheated almost to its boiling point. Cooling and heating as well as dilution of the solution make it uneconomic.

The method now developed will eliminate the disadvantages of the processes described above and make it possible to precipitate iron hydrolytically from a sulphate solution as a very pure jarosite. The sulphate solution, in which iron is dissolved in divalent ferrous form, is routed to the iron precipitation stage where the iron is oxidised into trivalent form using oxygen-containing gas. Present in the precipitation stage are alkali ions such as sodium, potassium or ammonium ions as well as jarosite nuclei, and the temperature of the solution is at most that of the boiling point of the solution. Precipitation is thus carried out in atmospheric conditions. The precipitation method is suitable for processes where iron is precipitated as jarosite. The essential features of the invention will be made apparent in the attached claims.

DETAILED DESCRIPTION

Figure 1:
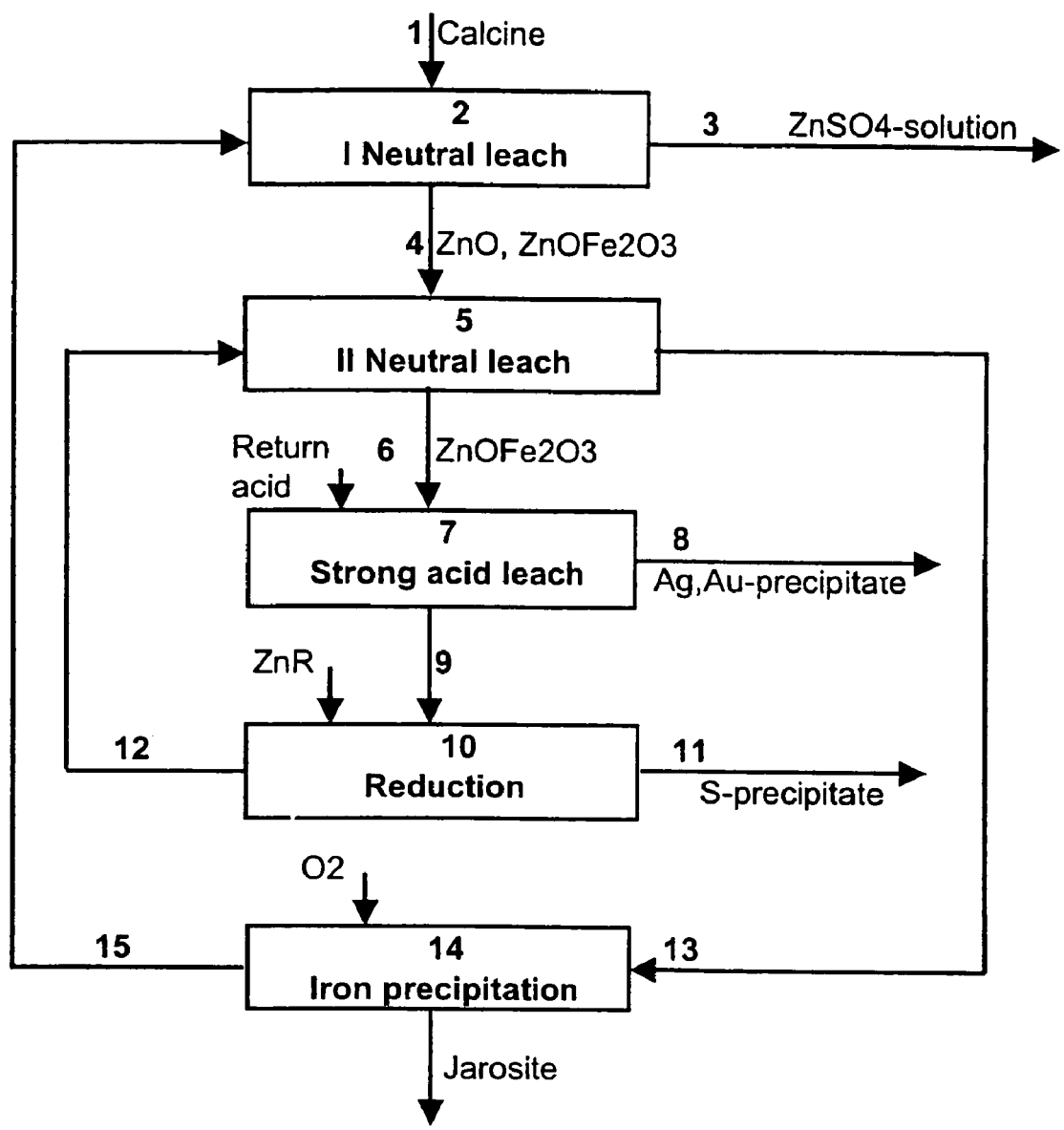
FIG. 1: the method of the invention is illustrated by flow chart 1.

It is possible with this method to treat for instance all the zinc concentrates on the market cost-effectively. Using this method it is possible to recover all the valuable metals contained in zinc calcine in conditions that are technically easy to control. In the above-mentioned processes iron is always precipitated as jarosite from a trivalent solution. The method of this invention is based on the fact that iron is precipitated from a solution where the iron is in divalent ferrous form. When precipitation is performed from a ferrous iron solution considerably greater precipitation rates are achieved than that in the method described for example in U.S. Pat. No. 4,305,914. Iron can be precipitated from a ferrous iron solution without a separate oxidation stage. The amount of zinc in the resulting jarosite is very small, only 0.1–0.3%.

In flow chart 1 the method of the invention is combined with an electrolytic zinc process, but please note that the method can be adapted for the precipitation of iron from other non-ferrous metal recovery processes, such as those of copper and nickel. In the method shown in flow chart 1 zinc calcine 1 is used as feed, which usually contains also other valuable metals. The zinc of the calcine is usually in the form of zinc oxide, but some of the zinc is also bound to the iron as zinc ferrite. The first treatment stage of the zinc calcine 1 is a neutral leach, which is preferable in two stages as is often the practice. In the neutral leach stages the calcine is leached with a dilute return acid solution of electrolysis so that the pH of the solution is maintained in the range of 2–5. From the first neutral leach stage 2 the zinc sulphate solution 3 obtained is taken to electrolysis via solution purification (not shown in detail in the diagram). The precipitate 4 from the first leach stage is taken to the second neutral leach stage 5, where the rest of the zinc oxide in the calcine dissolves.

The precipitate 6 from the second neutral leach stage 5 is routed to ferrite leaching i.e. a strong acid leach 7, which is carried out using return acid.

This stage may also be single or multi-stage. The $H_2SO_4$ content of the solution in the strong acid leach is of the order of 30–100 g/l. Precipitate 8 is obtained from ferrite leaching, containing mainly lead, silver, gold and other insoluble compounds such as silicates and gypsum. The precipitate may be routed to a valuable metals recovery process.

The calcine iron in the solution 9 generated in ferrite leaching is mainly trivalent as normal, but the solution is not now taken to the usual pre-neutralisation and iron precipitation, instead in accordance with the invention the iron is reduced to divalent form in a reduction stage 10. Reduction is carried out preferably using zinc concentrate or possibly for instance with sulphur dioxide. The following reactions occur in reduction, depending on the reductant:

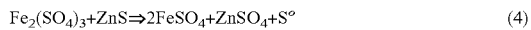

$$Fe_2(SO_4)_3 + ZnS \Rightarrow 2FeSO_4 + ZnSO_4 + S° \qquad (4)$$

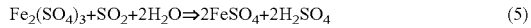

$$Fe_2(SO_4)_3 + SO_2 + 2H_2O \Rightarrow 2FeSO_4 + 2H_2SO_4 \qquad (5)$$

The precipitate 11 generated from reduction stage 10 contains sulphur formed in reduction and possibly the concentrate routed surplus, and it may be routed back to the roaster.

The reduction stage solution 12 is acidic, and has to be neutralised before the iron is precipitated. The solution now contains divalent iron and there is no danger of precipitation even at high temperatures, so that there is no need to cool the solution before pre-neutralisation. The solution can be neutralised as usual using zinc calcine, since ferrous iron hydroxide is more soluble than zinc hydroxide, so that iron remains in solution.

Pre-neutralisation can be performed in many different stages of the process, but the most beneficial is in the second stage 5 of the neutral leach, where the iron (II)-bearing solution is neutralised at as high a pH value as possible. In general the pH is raised at this stage to about 3. When neutralising is performed in the second stage of the neutral leach, the neutraliser is the precipitate from the first stage i.e. the undissolved zinc calcine, which is fed at this stage together with ferrite. The second neutral leach stage 5 solution 13 is routed to an iron precipitation stage 14. Iron is oxidised with oxygen-containing gas to trivalent in a solution that includes jarosite-forming ions (Na, K, $NH_4$ etc). Iron is then precipitated as jarosite according to the following reaction:

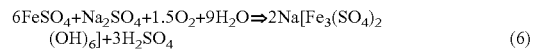

$$6FeSO_4 + Na_2SO_4 + 1.5O_2 + 9H_2O \Rightarrow 2Na[Fe_3(SO_4)_2(OH)_6] + 3H_2SO_4 \qquad (6)$$

Since iron is not precipitated in the pre-neutralisation stage 5, an internal circulation of iron in the strong acid leach and reduction stage is avoided, as only the ferrite precipitate that remains undissolved in the neutral leach is taken to the strong acid leach stage 7. The iron-containing solution 13 is routed after neutralisation directly to an iron precipitation 14. The iron precipitation stage yields a jarosite precipitate free of valuable metals and a zinc sulphate solution 15, that has such a low amount of iron that the solution can be taken to the first neutral leach stage.

It is known that the metals such as gallium, indium and germanium, which are in zinc concentrate in small amounts dissolve during ferrite leaching and are always precipitated with ferric iron. The separation of these metals is very difficult if the iron is kept in ferric form the whole time. As the iron in the solution going to pre-neutralisation is now divalent, the recovery of the above-mentioned metals is possible for example by neutralising some of the solution separately before it is taken to the actual neutralising stage 5. In this case the solution is neutralised preferably at least to a pH value of 4, whereby an iron-free precipitate containing Ga, In and Ge is achieved.

When using the method of this invention, it can be seen that the valuable materials contained in zinc concentrate can be recovered well at different stages and that the resulting jarosite is pure. When iron is precipitated from a ferrous iron solution, it is shown e.g. from reaction (6), that only half the amount of sulphuric acid is generated compared with that generated in a ferric iron solution precipitation as in reaction (3). If zinc concentrate is used in the ferric iron reduction stage 10, the reduction reactions do not produce sulphuric acid, and thus only half as much sulphuric acid is generated as in conventional processes.

The flow chart shows a method where the solution coming from ferrite leaching is reduced in a separate reduction stage, but reduction can also take place in connection with the strong acid leach stage without a separate reduction stage.

The precipitation of divalent iron from a solution is described further by the following example.

EXAMPLE 1

A solution was treated that contained zinc sulphate corresponding to 100 g/l $Zn^{2+}$ and in addition 25 g/l ferrous iron, 2.5 g/l $NH_4$ and 10 g/l of sulphuric acid plus an additional 200 g/l jarosite nuclei. The solution was heated to a temperature of 100° C. in a closed vessel. The slurry was mixed well and $O_2$ gas was fed into it under the propeller, so that the partial pressure of the oxygen was held at 0.5 bar. The total iron and ferrous iron were monitored with samples, and the results are shown in the table below. The results also plainly show that in a few hours the iron can be made to precipitate to such a low level that it is possible to return the solution to the first neutral leach stage. Based on X-ray diffraction investigation the resulting precipitate was jarosite. The filtering properties of the jarosite precipitate were good. The amount of zinc left in the final precipitate was minimal.

This example indicates that sufficient iron is precipitated even though the solution is only neutralised up to the point where it still contains 10 g/l sulphuric acid, which corresponds to a pH value of about 1. Professionals in the field know that the results will improve considerably if the solution is neutralised further, for instance to a pH value of 2–4, which is completely realistic. In addition the ammonium content of the example was lower than is usually the case in zinc processes. The required ammonium, $NH_4$, can also be fed as ammonia, $NH_3$, to the precipitation stage, wherein a little less acid is generated:

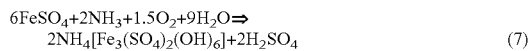

$$6FeSO_4 + 2NH_3 + 1.5O_2 + 9H_2O \Rightarrow 2NH_4[Fe_3(SO_4)_2(OH)_6] + 2H_2SO_4 \quad (7)$$

Instead of ammonium sodium hydroxide NaOH may also be used. Since such unfavourable conditions also give such a good result, it is absolutely clear that with higher pH levels, the results will be even better.

TABLE 1

| Time h | Tot Fe g/l | Fe2+ g/l | NH4 g/l | H2SO4 g/l | Fe3+ g/l |
|---|---|---|---|---|---|
| 0 | 25.0 | 25.0 | 2.5 | 10.0 | 0.0 |
| 0.25 | 22.5 | 17.1 | | | 5.4 |
| 0.5 | 19.0 | 12.8 | | | 6.2 |
| 1 | 9.6 | 7.1 | | | 2.5 |
| 2 | 5.8 | 3.1 | | | 2.7 |
| 3 | 4.5 | 1.9 | | | 2.6 |
| 4 | 3.7 | 1.3 | | | 2.4 |
| Final precip. % | Fe 34.2 | Zn 0.26 | S 13.8 | RDX: Jarosite | |

The invention claimed is:

1. A method for hydrolytic precipitation of iron as jarosite from a sulphate-containing solution in connection with zinc recovery from zinc calcine, which recovery contains neutral leach, ferrite leach, zinc electrolysis and iron precipitation stages, comprising: leaching the ferrite included in the calcine with return acid of the zinc electrolysis; after which reducing the ferric iron generated in the leach to ferrous form and neutralizing the ferrous iron; and in the iron precipitation stage, oxidizing the neutralized ferrous iron into trivalent form using oxygen-containing gas, with sodium, potassium or ammonium ions and jarosite nuclei being present in the iron precipitation stage and the temperature of the iron precipitation stage being at most that of the boiling point of the solution.

2. A method according to claim 1, wherein the ferric iron is reduced using zinc concentrate.

3. A method according to claim 1, wherein the ferric iron is reduced using sulphur dioxide.

4. A method according to claim 1, wherein the reduction of the ferric iron is carried out using zinc concentrate, which is added to the ferrite leach stage.

5. A method according to claim 1, wherein the ferrous iron contained in the solution from the ferric iron reducing stage is neutralised with zinc calcine.

6. A method according to claim 1, wherein the ferrous iron contained in the solution from the ferric iron reducing stage is neutralised by routing the solution to the latter stage of a two-stage neutral leach of zinc calcine.

7. A method according to claim 1, wherein the ferrous iron contained in the solution from the ferric iron reducing stage is neutralised at least to a pH level of 4 in order to precipitate gallium, indium and germanium.

8. A method for the hydrolytic precipitation of iron as jarosite from a sulphate-containing solution in connection with zinc recovery, comprising: leaching zinc calcine in a two-stage neutral leach; electrolysing the zinc sulphate solution formed and leaching the remaining undissolved ferrite with return acid of die electrolysis in a ferrite leach stage; reducing to divaleni form the ferrie iron dissolved in the ferrite leach; after which routing the precipitate formed to a zinc roaster and the solution to the second stage of the neutral leach; where the solution in the second stage of the neutral leach is neutralised using the residue from the first neutral leach stage; routing a residue from the second neutralisation stage to the ferrite leach and routing the neutralised solution to the iron precipitation stage; where the iron in the iron precipitation stage is precipitated as jarosite with oxygen in the presence of alkali or ammoniuni ions and jarosite nuclei.

9. A method according to claim 8, wherein the ferric iron is reduced using zinc concentrate.

10. A method according to claim 8, wherein the ferric iron is reduced using sulphur dioxide.

* * * * *

UNITED STATES PATENT AND TRADEMARK OFFICE
CERTIFICATE OF CORRECTION

| | |
|---|---|
| PATENT NO. | : 7,118,719 B2 |
| APPLICATION NO. | : 10/450921 |
| DATED | : October 10, 2006 |
| INVENTOR(S) | : Sigmund Fugleberg |

It is certified that error appears in the above-identified patent and that said Letters Patent is hereby corrected as shown below:

Column 6, line 26, replace "die" with -- the --.

Column 6, line 27, replace "divaleni form the ferrie iron" with -- divalent form the ferric iron --.

Signed and Sealed this

Nineteenth Day of December, 2006

JON W. DUDAS
*Director of the United States Patent and Trademark Office*